United States Patent [19]

Perkins

[11] Patent Number: 4,746,148

[45] Date of Patent: May 24, 1988

[54] LIMITING STRUCTURE FOR AXIAL EXPANSION JOINT

[75] Inventor: Gregory A. Perkins, San Antonio, Tex.

[73] Assignee: Flexonics Inc., Bartlett, Ill.

[21] Appl. No.: 19,647

[22] Filed: Feb. 27, 1987

[51] Int. Cl.[4] .............................................. F16L 27/00
[52] U.S. Cl. ...................................... 285/114; 285/226
[58] Field of Search ............... 285/114, 226, 227, 228, 285/301, 299, 265

[56] References Cited

U.S. PATENT DOCUMENTS

| 3,876,235 | 4/1975 | Flint ................................. | 285/301 X |
| 3,915,482 | 10/1975 | Fletcher et al. ................. | 285/265 X |
| 4,480,858 | 11/1984 | Ayers ................................. | 285/114 |
| 4,542,921 | 9/1985 | Marti et al. ........................ | 285/114 |

FOREIGN PATENT DOCUMENTS

| 138092 | 10/1979 | German Democratic Rep. ................................... | 285/114 |
| 2034843 | 6/1980 | United Kingdom ................ | 285/114 |

Primary Examiner—Thomas F. Callaghan
Attorney, Agent, or Firm—Wood, Dalton, Phillips, Mason & Rowe

[57] ABSTRACT

A structure for restraining pressure thrust loads of a bellows joint while allowing angular rotation between two pipe ends is provided with a pair of toroidal limiting rings having a circular cross-section and stop rings on their inner circumference. The limiting rings are secured at an axial spacing and encircle the pipe ends. Shear lugs are fixed around each pipe end. The stop rings are engaged by the shear lugs to limit the axial expansion of the joint. The limiting rings are secured together by either two hinge arms or a gimbal ring. The gimbal ring uses two pairs of hinge arms, each at 180° spacing and one pair offset 90° relative to the other, with one pair of hinge arms securing the gimbal ring to one limiting ring, and the other pair of hinge arms securing the gimbal ring to the other limiting ring.

18 Claims, 2 Drawing Sheets

LIMITING STRUCTURE FOR AXIAL EXPANSION JOINT

DESCRIPTION

1. Technical Field

The invention relates to piping expansion joints and more particularly to a structure for limiting axial expansion in a pipe joint due to internal pressure.

2. Background of the Invention

In view of thermal expansion and contraction present in many pipe systems, it is often necessary to allow for controlled motion. Expansion joints are commonly used to allow for such motion.

In some applications, it is necessary to ensure that the expansion joint be free to absorb motion, and that hardware be added to absorb the pressure thrust load. Two structures which have heretofore been used are shown in FIGS. 1 and 2, respectively (and are discussed in detail in the Description of the Preferred Embodiments). One such structure has double rings welded to each pipe end with gussets connecting those rings. The rings of this structure, however, interfere with thermal radial growth of the pipe, and thus cause undesirable stress concentrations. Another structure heretofore used includes rings having box-shaped cross-sections, with rings that are around opposite pipe ends and interconnected to engage shear lugs secured to the pipe ends. While this structure has eliminated many of the stress concentrations arising in the other described prior art structure, it can be difficult to assemble, and requires a number of welds which result in warpage of the limiting structure.

U.S. Pat. No. 3,876,235 discloses yet another structure for restraint of pressure thrust for expansion joints.

The invention is directed toward providing an expansion pipe joint limiting structure which is improved over the structures described above.

SUMMARY OF THE INVENTION

In one aspect of the invention, a structure for restraint of pressure thrust for a bellows expansion joint between two pipe ends is provided. The structure includes a pair of toroidal limiting rings having a circular cross-section and stop rings on their inner circumference. The limiting rings are secured at an axial spacing and encircle the pipe ends. Shear lugs are fixed around each pipe end. The stop rings are engaged by the shear lugs to limit the axial expansion of the joint due to internal pressure thrust.

The structure limits axial expansion (due to internal pressure) while allowing the expansion joint to pivot in one or more planes, depending on whether it is a hinged unit (one plane) or a gimbal unit (multiple planes). The piping system will grow due to thermal expansion but the hinged (or gimbaled) expansion joints "redirects" the large movements while the torsion rings keep the pipe from "blowing apart".

It is one object of the invention to provide a structure capable of limiting pressure thrust of a pipe expansion joint.

Another object of the invention is to provide a limiting structure which does not hinder radial expansion of the pipe occurring in high temperature applications.

Yet another object of the invention is to minimize undesirable stress concentrations in the pipe ends.

Another object of the invention is to minimize the amount of material required to limit axial expansion of an expansion joint.

Still another object of the invention is to minimize warpage which can result from welding in the structure.

Yet another object of the invention is to minimize axial deflection under loading of the limiting structure.

A still further object of the invention is to provide a limiting structure which may be easily installed during assembly of an expansion joint.

BRIEF DESCRIPTION OF THE DRAWINGS

FIG. 4A is an enlargement of a portion of FIG. 4; and

DESCRIPTION OF THE PREFERRED EMBODIMENTS

Figure 1:
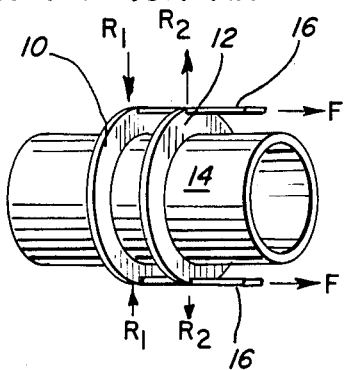
FIG. 1 is a perspective view of one side of a prior art assembly for restraint of pressure thrust of an expansion joint.

Limiting structures are frequently used which are subjected to large pressure thrust loadings at expansion joints. Half of one such assembly which has heretofore been used is shown in FIG. 1. This assembly includes double rings 10,12 welded to each pipe end 14 (only one of which is shown in FIG. 1), the rings 10,12 being connected by gussets 16. The gussets 16 on opposite pipe ends 14 are typically connected by a gimbal ring or hinge arms (not shown). The FIG. 1 assembly is, on each pipe end 14, subjected to a longitudinal load F balanced by a couple moment $R_1$, $R_2$ which consists of diametrically opposed forces acting radially on the double rings 10,12. In high temperature applications, the rings 10,12 of this prior art assembly act as cooling fins. The portion of the pipe 14 encircled by the rings 10,12 is cooled and does not expand radially as much as the adjacent section of the pipe, causing excessive radial stress in the pipe. The cooled rings 10,12 also interfere with the larger thermal radial growth of the pipe 14 at the weld between the rings 10,12 and pipe 14 to further cause excessive stress concentrations in the radial direction of the pipe 14.

Figure 2:
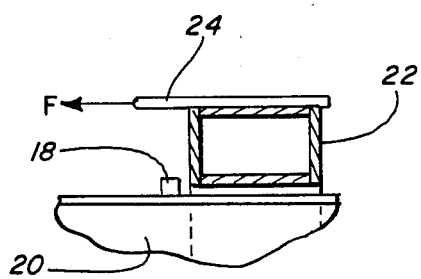
FIG. 2 is a fragmentary cross-section of another prior art assembly for restraint of pressure thrust of an expansion joint.

An assembly which has also been used heretofore and which attempts to overcome the FIG. 1 problems is shown in FIG. 2. With this assembly, a shear lug 18 is suitably fixed (as by welding) in a ring about each pipe end 20 (only one pipe end 20 is shown in FIG. 2). Two rings 22 (only one of which is shown in FIG. 2) are floated around the pipe ends 20 and are connected by hinge arms 24 (or a gimbal ring) which space the rings 22 so that they are engaged by the lugs 18 when the pipe joint has reached the limit of axial expansion. The rings 22 are typically box-shaped in cross-section, as shown.

Figure 3:
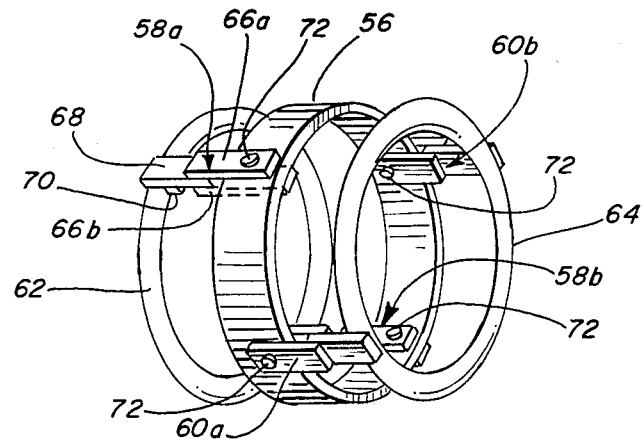
FIG. 3 is a perspective view of a portion of one embodiment of the present invention.
Figure 4:
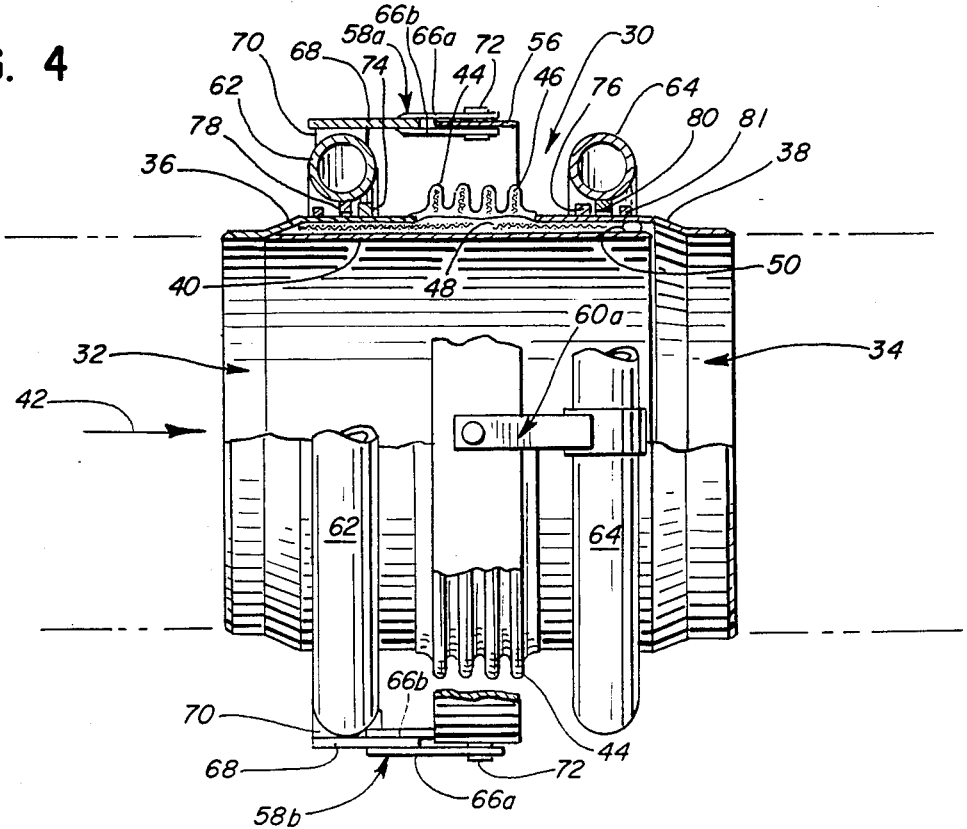
FIG. 4 is a partial cross-sectional view of an expansion joint including the limiting assembly shown in FIG. 3.

A first embodiment of the present invention which has been found to have significant advantages over the above-described prior art assemblies is illustrated in Figs. 3 and 4.

Referring first to FIG. 4, an expansion joint 30 with two pipes 32,34 is illustrated. The present invention relates to the structure for restraint of pressure loads in expansion joints, though an exemplary structure for accommodating motion is illustrated in FIG. 4 and will be described here. Specifically, the pipes 32,34 have enlarged ends 36, 38 which are spaced from one another and accommodate a liner 40 therein. The liner provides a substantially uniform inner diameter with the pipes 32,34 and is secured to the pipe 32 at the end from which the flow comes (flow being in the direction of arrow 42). The enlarged pipe ends 36,38 are secured to opposite ends of a bellows 44 which allows for axial growth and angular rotation of the pipes while sealing against leakage from the system. Additional joint sealing can be provided by suitable insulation packing 46 in the corrugations of the bellows 44 and wrapped in stainless steel wire mesh 48 in the annular space around the liner 40. A stainless steel braided hose 50 is also provided between the liner 40 and the forward pipe end 34 to seal the packing around the liner 40 while allowing axial movement of the forward pipe end 34 relative to the liner 40. An annular cover (not shown) is also commonly provided around the bellows 44.

Referring now to the assembly for limiting the axial expansion of the joint 30, a gimbal ring 56 is provided with hinge arms 58a,58b,60a,60b securing a pair of limiting rings 62,64 at a selected spacing. Specifically, two hinge arms 58a,58b at 180° spacing are secured to one limiting ring 62 and two hinge arms 60a,60b, also at 180° spacing and offset 90° from the other hinge arms 58a,58b, are secured to the other limiting ring 64.

The limiting rings 62,64 are toroidal with circular cross-sections (as best seen in FIGS. 4 and 4A), and may be formed from rolled pipe having minimal welds.

Each hinge arm consists of a pair of plates 66a, 66b bolted to the gimbal ring 56 with a third plate 68 suitably secured between those plates 66a,66b, as by welding (see particularly FIG. 4). A suitable mounting bracket 70 is fixed to the third plate 68 (by, e.g., welding), which bracket 70 is also secured to the outer circumference of the associated limiting ring 62 or 64 (again, as by welding). Each hinge arm pair 58a,58b and 60a,60b hinges about the bolts 72 which define a hinge axis generally perpendicular to the pipe center line.

Shear lugs 74,76 are suitably secured to the pipe ends 36,38, as by welding. The lugs 74,76 can be either two rings, one welded circumferentially around each pipe end 36, 38, or they can comprise multiple spaced lugs disposed generally in a ring about each pipe end 36,38. While spaced lugs tend to restrict radial expansion less than a one-piece ring lug would, in either event the restriction of radial expansion is minimized inasmuch as the lugs 74,76 do not extend radially outwardly far enough to significantly cool the pipe end 36,38 and cause the radial stresses encountered in the FIG. 1 structure.

The limiting rings 62,64 also each have a stop ring 78,80 secured to their inner circumference, as by welding. The inner diameter of the stop rings 78,80 is greater than the outer diameter of the pipe ends 36,38 and less than the outer diameter of the shear lugs 74,76. The limiting rings 62,64 are disposed with the shear lugs 74,76 between the stop rings 78,80 as shown in FIG. 4.

The stop rings 78,80 float on the pipe ends 36,38 to allow motion in the joint within limits (when engaged by the shear lugs 74,76) and they do not restrict radial thermal expansion of the pipe endds 36,38. The gimbal ring 56 mounting two sets of arms 58a, 58b,60a,60b at 180° spacing allows the limiting rings 62,64 to pivot about two axes to accommodate lateral thrust loads and angular rotation at the joint (arising, e.g., in the area of pipe bends), uneven axial expansion, and/or imprecise mounting of the shear lugs 74,76. This structure additionally allows the limiting rings 62,64 to be securely and easily mounted at a selected spacing.

Shear lugs or blocks 81 may be provided around the pipe ends 36,38 and outside the stop rings 78,80 to limit motion of the pipe ends 36,38 together if desired in a particular pipe system.

Figure 6:
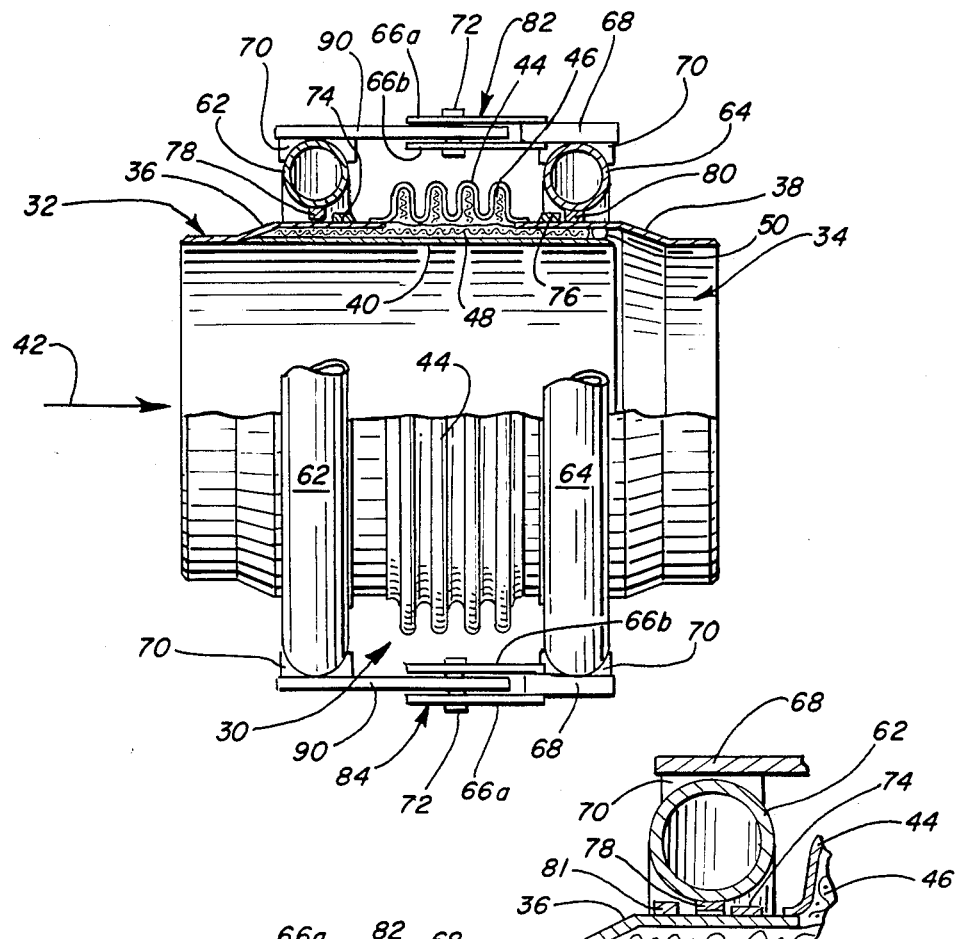
FIGS. 5 and 6 are similar to FIGS. 3 and 4 respectively, but illustrate a second embodiment of the present invention.
Figure 5:
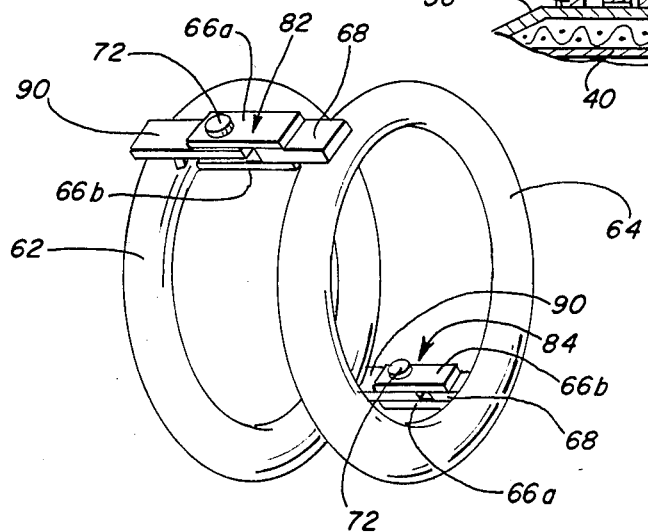

An alternative embodiment of the invention is shown in FIGS. 5 and 6 with parts given the same reference numerals as corresponding parts in the above-described embodiment of FIGS. 3 and 4. The alternative embodiment differs from the first-described embodiment in that there is no gimbal ring and two hinge arms 82,84 directly secure the two limiting rings 62,64 together. Specifically, each hinge arm 82,84 includes two plates 66a,66b welded to a third plate 68 secured to a limiting ring 70 and further includes a fourth plate 90 secured to the other limiting ring 62 and bolted between the first two plates 66a,66b. This embodiment thus also allows for pivoting of the limiting rings 62,64 about one axis to also accommodate lateral thrust loads and angular rotation between pipe ends.

With both embodiments of the limiting assembly, radial expansion of the pipe ends 36,38 in high temperature applications is unhindered, thereby eliminating undesirable stress concentrations found in the prior art of FIG. 1. Further, the use of toroid-shaped limiting rings 62,64 with circular cross-sections is more effective in withstanding the loads on the assembly than the box-shaped rings 22 of the prior art. This increased efficiency allows for use of less material than would be required for prior art rings of similar strength. Still further, the toroid-shaped limiting rings 62,64 may be formed with fewer welds than the prior art limiting rings, with a corresponding reduction in warpage resulting from welds. The present invention has further been found to have less deflection under loading than the FIG. 2 prior art assembly. Finally, the above-described invention allows for very easy and simple installation during assembly of a pipe joint.

Other aspects, objects and advantages of the invention can be discerned from a study of the drawings, the disclosure and the appended claims.

I claim:

1. A limiting structure for restraint of pressure thrust loads of an expansion joint between two pipe ends, comprising:

shear lugs rigidly fixed around each pipe end, each shear lug having an outer diameter;

a pair of torodial limiting rings about the pipe ends, said rings being circular in cross-section;

stop rings fixed to each limiting ring, said stop rings having inner diameters less than said outer diameter; and means for securing the limiting rings at an axial spacing with the shear lugs disposed between the stop rings.

2. The limiting structure of claim 1, wherein each limiting ring has an inner diameter greater than the outer diameter of the associated stop ring.

3. The limiting structure of claim 1, wherein the securing means is fixed to the outer circumference of the limiting rings.

4. The limiting structure of claim 1, wherein the securing means comprises a gimbal ring adapted to direct angular rotation between pipe ends, said gimbal ring having a first pair of hinge arms connected to one limiting ring and a second pair of hinge arms connected to the other limiting ring, the arms of each pair being spaced substantially 180° and the first arm pair being offset 90° relative to the second arm pair.

5. The limiting structure of claim 4, wherein the hinge arms are fixed to the outer circumference of the limiting rings.

6. The limiting structure of claim 1, wherein the securing means comprises a pair of hinge arms extending between the limiting rings, said arms being spaced substantially 180°.

7. The limiting structure of claim 6, wherein the hinge arms are fixed to the outer circumference of the limiting rings.

8. The limiting structure of claim 6, wherein said arms are pivoted about an axis disposed generally perpendicular to the pipe center line.

9. The limiting structure of claim 1, wherein each pipe end has a plurality of spaced shear lugs disposed in a ring therearound.

10. The limiting structure of claim 1, wherein the limiting rings are formed of rolled pipe.

11. In an expansion joint of two pipe ends allowing motion of the pipe ends toward and away from one another, a structure for limiting motion of the pipe ends away from one another comprising:
    first and second toroidal limiting rings disposed around opposite pipe ends, said limiting rings being circular in cross-section;
    means for securing said limiting rings at a spacing, said securing means being fixed to the outer circumference of the limiting rings;
    stop rings fixed to the inner circumference of the limiting rings; and
    shear lugs fixed to said pipe ends and adapted to engage the stop rings at a limit of spacing between pipe ends.

12. The joint of claim 11, wherein the stop ring inner diameter is greater than the pipe end outer diameter and less than the shear lug outer diameter.

13. The joint of claim 12, wherein the limiting rings have inner diameters greater than the shear lug outer diameter.

14. The joint of claim 11, wherein the securing means comprises a gimbal ring adapted to direct angular rotation between pipe ends, said gimbal ring having a first pair of hinge arms connected to one limiting ring and a second pair of hinge arms connected to the other limiting ring, the arms of each pair being spaced substantially 180° and the first arm pair being offset 90° relative to the second arm pair.

15. The joint of claim 11, wherein the securing means comprises a pair of hinge arms extending between the limiting rings, said arms being spaced substantially 180°.

16. The joint of claim 15, wherein said arms are pivoted about an axis disposed generally perpendicular to the pipe center line.

17. The joint of claim 11, wherein each pipe end has a plurality of spaced shear lugs disposed in a ring therearound.

18. The joint of claim 11, wherein the limiting rings are formed of rolled pipe.

* * * * *